(12) United States Patent
Bamberger et al.

(10) Patent No.: US 10,193,342 B2
(45) Date of Patent: Jan. 29, 2019

(54) METHOD AND DEVICE FOR CONTROLLING POWER GENERATORS OF A SUBGRID WITHIN AN INTERCONNECTED GRID

(71) Applicant: SIEMENS AKTIENGESELLSCHAFT, München (DE)

(72) Inventors: Joachim Bamberger, München (DE); Ulrich Münz, München (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 252 days.

(21) Appl. No.: 14/900,434

(22) PCT Filed: Jun. 10, 2014

(86) PCT No.: PCT/EP2014/061978
§ 371 (c)(1),
(2) Date: Dec. 21, 2015

(87) PCT Pub. No.: WO2014/202426
PCT Pub. Date: Dec. 24, 2014

(65) Prior Publication Data
US 2016/0141877 A1    May 19, 2016

(30) Foreign Application Priority Data

Jun. 21, 2013  (DE) .................. 10 2013 211 840

(51) Int. Cl.
*H02J 3/38*    (2006.01)
*H02J 3/00*    (2006.01)

(52) U.S. Cl.
CPC ............. *H02J 3/381* (2013.01); *H02J 3/382* (2013.01); *H02J 2003/007* (2013.01); *Y02E 60/76* (2013.01); *Y04S 40/22* (2013.01)

(58) Field of Classification Search
CPC ..................... H02J 2003/007; H02J 3/381
See application file for complete search history.

(56) References Cited

U.S. PATENT DOCUMENTS

| 8,183,714 B2* | 5/2012 | McDonnell | H02J 3/34 307/82 |
| 8,350,412 B2* | 1/2013 | Massie | H02J 3/00 307/65 |

(Continued)

FOREIGN PATENT DOCUMENTS

WO    WO2012037989 A2    3/2012

OTHER PUBLICATIONS

Costea C. et al., "A Distributed Control for Interconnected Systems," 2012 IEEE INernational Conference on Automation Quality and Testing Rotoics (AQTR), May 24-27, 2002, IEEEXplore, pp. 74-78, DOI: 10.1109/AQTR.2012.6237678, 2012.

(Continued)

*Primary Examiner* — Thienvu Tran
*Assistant Examiner* — Pinping Sun
(74) *Attorney, Agent, or Firm* — Lempia Summerfield Katz LLC

(57) ABSTRACT

Disclosed is a subnetwork controller for a subnetwork within an interconnected grid. The controller controls power generators, subnetworks, or loads of the subnetwork in accordance with sensor-captured internal measured variables and sensor-captured external measured variables as well as external controlled variables of the subnetwork in (Continued)

such a way that a dynamic behavior of the subnetwork in relation to its adjacent subnetworks corresponds to a defined desired behavior.

19 Claims, 2 Drawing Sheets

(56) References Cited

U.S. PATENT DOCUMENTS

| | | | | |
|---|---|---|---|---|
| 8,649,914 | B2* | 2/2014 | Miller | G06F 1/263 |
| | | | | 700/286 |
| 8,829,828 | B2* | 9/2014 | Godridge | H02P 9/00 |
| | | | | 318/400.02 |
| 8,854,015 | B2* | 10/2014 | Deng | H02P 9/00 |
| | | | | 290/44 |
| 2006/0229767 | A1 | 10/2006 | Chu et al. | |
| 2008/0143304 | A1* | 6/2008 | Bose | H02J 3/06 |
| | | | | 323/205 |
| 2011/0144819 | A1* | 6/2011 | Andrews | G01D 4/004 |
| | | | | 700/291 |
| 2012/0029720 | A1* | 2/2012 | Cherian | H02J 13/00 |
| | | | | 700/297 |
| 2012/0083935 | A1* | 4/2012 | Wells | H02J 3/381 |
| | | | | 700/292 |
| 2012/0267952 | A1* | 10/2012 | Ballatine | H02J 1/102 |
| | | | | 307/26 |
| 2012/0271576 | A1* | 10/2012 | Kamel | H02J 13/0006 |
| | | | | 702/62 |
| 2014/0114844 | A1* | 4/2014 | Forbes, Jr. | G05D 17/00 |
| | | | | 705/39 |
| 2015/0145332 | A1* | 5/2015 | Bamberger | H02J 3/16 |
| | | | | 307/31 |

OTHER PUBLICATIONS

German Office action for related German Application No. 10 2013 211 840.6, dated May 26, 2014, with English Translation.
PCT International Search Report and Written Opinion of the International Searching Authority dated Nov. 3, 2014 for corresponding PCT/EP2014/061978, with English Translation.
Scattolini R., "Architectures for distributed and hierarchical Model Predicitive Control—A review," Journal of Process Control, vol. 19, pp. 723-731, DOI: 10.1016/j.jprocont.2009.02.003, 2009.

* cited by examiner

METHOD AND DEVICE FOR CONTROLLING POWER GENERATORS OF A SUBGRID WITHIN AN INTERCONNECTED GRID

The present patent document is a § 371 nationalization of PCT Application Serial Number PCT/EP2014/061978, filed Jun. 10, 2014, designating the United States, which is hereby incorporated by reference, and this patent document also claims the benefit of DE 10 2013 211 840.6, filed on Jun. 21, 2013, which is also hereby incorporated by reference.

TECHNICAL FIELD

The embodiments relate to a method and to a device, in particular a sub-grid controller, for controlling power generators of a sub-grid within an interconnected grid.

BACKGROUND

Electrical grids, for instance the European electrical grid, may consist of a multiplicity of sub-grids. For instance, the German electrical grid is a sub-grid within the European electrical grid. This sub-grid may itself consist of various sub-grids. For instance, the German electrical grid includes a sub-grid for supplying the urban area of the city of Hamburg and a sub-grid for supplying the Munich urban area. Each sub-grid consists of a plurality of nodes or power supply buses, which are connected to one another via lines. Power generators and consumers or loads may be connected to the nodes. It is also possible, however, for subnetworks, which are hierarchically lower-level sub-grids of the sub-grid, to be connected to the nodes. Each sub-grid may in itself already have a relatively high complexity. The loads may be aggregated loads, for example, the power supply load of a housing estate or factory. The power generators, for example, are gas turbines or coal-fired power stations. The subnetworks may in turn consist of a plurality of nodes connected to one another via lines, to which nodes are attached power generators, loads, or sub-subnetworks. The various distribution grids may be connected to one another via high-voltage transmission grids.

Distributed renewable and, in some cases, also controllable electricity generators or power generators are being used increasingly in electrical grids. A possible result of this, for instance, is that in a country such as Germany, the maximum possible amount of power generated by renewable energy sources reaches or even exceeds the magnitude of the total load of the country. For instance, depending on weather conditions, the power generated by the renewable energy sources may surpass at least temporarily, for instance, for hours or weeks, the total consumption of power in the country concerned, in particular given future expansion of the electrical grids by deployment of further renewable energy sources.

With conventional electrical grids such as those currently in use, however, there is a problem with the further expansion of the electrical grid by renewable energy sources in that a certain proportion of conventional power generators, in particular coal-fired power stations or nuclear power stations, are needed in order to achieve grid stability. The grid stability is analyzed, for example, on the basis of dynamically non-linear simulations of the transmission grid. These non-linear simulations are based on detailed models of a relatively small number of conventional power generators. The loads contained in the electrical grid may be represented by distribution-grid areas containing connected or aggregated loads and a few non-controlled distributed generators. The grid stability is achieved by operating the conventional power generators according to suitable active-power and reactive-power rules. The larger the number of different distributed, in particular renewable, power generators, within the grid, the less possible it becomes to achieve or provide stability of the entire interconnected grid using the conventional techniques, in particular simulation techniques.

SUMMARY AND DESCRIPTION

The scope of the present invention is defined solely by the appended claims and is not affected to any degree by the statements within this summary. The present embodiments may obviate one or more of the drawbacks or limitations in the related art.

An object of the present embodiments is to provide a method and a device for controlling components such as power generators, loads, and subnetworks of a sub-grid within an interconnected grid, which method and device may be used to achieve a grid stability even for a relatively large number of distributed power generators.

The embodiments provide a sub-grid controller for a sub-grid within an interconnected grid, which controller controls power generators, loads, or subnetworks of the sub-grid according to sensor-detected internal measured variables and/or sensor-detected external measured variables and external manipulated variables of the sub-grid in such a way that a dynamic behavior of the sub-grid with respect to its neighboring sub-grids corresponds to a defined target behavior. The external manipulated variables may be defined by a hierarchically higher-level controller, in particular by a controller of the interconnected grid.

A fundamental idea is to break down or subdivide a large, highly complex electrical grid into different areas or sub-grids, wherein each of these areas may be reduced to smaller or less comprehensive dynamic models for the area concerned. The discrete area may be, for example, the area of a distribution grid, in particular a local distribution grid. In addition, a group of a few large conventional generators in the area of a transmission grid may form a discrete area of this type.

In a possible embodiment of the sub-grid controller, the sub-grid controller calculates a control vector $\vec{u}$ for the power generators, loads, and subnetworks from a vector $\vec{y}$ of the internal measured variables and a vector $\vec{v}$ of the external measured variables and manipulated variables as follows:

$$\vec{u} = K \cdot \vec{y} + L \cdot \vec{v},$$

where K is an output feedback matrix, and L is a feed-forward matrix.

This embodiment has the advantage that calculating the control vector has a relatively low computational complexity and the calculation may be performed relatively quickly.

In another possible embodiment of the sub-grid controller, the external measured variables of the sub-grid are detected by sensors, which are arranged on connecting lines between the sub-grid and its neighboring sub-grids.

This embodiment has the advantage that the external measured variables may be detected accurately by sensors, and the control vector calculated therefrom allows precise, reliable control of the power generators.

In another possible embodiment of the sub-grid controller, the internal measured variables are detected by sensors, which are arranged on lines and devices within the sub-grid.

This embodiment also has the advantage that the measured variables, (e.g., the internal measured variables), may be detected accurately by sensors, and the control-vector control variables calculated therefrom allow precise open-loop and closed-loop control of the power generators.

In another possible embodiment of the sub-grid controller, the sub-grid controller receives from an operator of the interconnected grid the target behavior and the external setpoint values. The received target behavior is in this case intended to stabilize the interconnected grid.

This has the advantage that the operator of the interconnected grid may define a desired target behavior for the various sub-grids so that the interconnected grid composed of the sub-grids behaves as stably as possible in accordance with the requirements from the interconnected-grid operator.

In another possible embodiment of the sub-grid controller, the instantaneous state of the sub-grid may be calculated by the following differential equation:

$$\dot{\vec{x}} = A \cdot \vec{x} + B_1 \cdot \vec{u} + B_2 \cdot \vec{v} + B_3 \cdot \vec{w}$$

where $\vec{x}$ is the state vector of the sub-grid, $\vec{u}$ is the control vector for controlling the controllable power generators, loads and subnetworks within the sub-grid, $\vec{v}$ is the vector of the sensor-detected external measured variables and external manipulated variables, and $\vec{w}$ is the disturbance vector, and where $A$, $B_1$, $B_2$, $B_3$ are matrices.

This embodiment has the advantage that the internal state of the sub-grid may be calculated precisely for each point in time and it is thereby possible to respond quickly to instabilities within the sub-grid.

In another possible embodiment of the sub-grid controller, the vector $\vec{y}$ of the internal measured variables of the sub-grid may be calculated by the following equation:

$$\vec{y} = C \cdot \vec{x} + D_1 \cdot \vec{u} + D_2 \cdot \vec{v} + D_3 \cdot \vec{w}$$

where $\vec{x}$ is the state vector of the sub-grid, $\vec{u}$ is the control vector for controlling the controllable power generators, loads and subnetworks within the sub-grid, $\vec{v}$ is the vector of the sensor-detected external measured variables and external manipulated variables, and $\vec{w}$ is the disturbance vector, and where $C$, $D_1$, $D_2$, $D_3$ are matrices.

This embodiment has the advantage that the vector of the internal measured variables may be calculated quickly and reliably so that the open-loop and/or closed-loop control of the components of the sub-grid may be performed precisely and promptly.

In another possible embodiment of the sub-grid controller, an output vector $\vec{z}$ of the output variables of the sub-grid may be calculated by the following equation:

$$\vec{z} = E \cdot \vec{x} + F_1 \cdot \vec{u} + F_2 \cdot \vec{v} + F_3 \cdot \vec{w}$$

where $\vec{x}$ is the state vector of the sub-grid, $\vec{u}$ is the control vector for controlling the controllable components of the sub-grid, $\vec{v}$ is the vector of the sensor-detected external measured variables and external manipulated variables, and $\vec{w}$ is the disturbance vector, and where $E$, $F_1$, $F_2$, $F_3$ are matrices.

This embodiment has the advantage that the output variables of the sub-grid, which are relevant to the operation of the interconnected grid, may be calculated quickly and reliably.

In another possible embodiment of the sub-grid controller, the sub-grid controller is a central controller provided in the sub-grid concerned. It is also possible here for local controllers to be implemented in the components of the sub-grid.

This embodiment has the advantage that only one central controller needs to be provided for each sub-grid and therefore the additional technical expenditure is kept under tight control.

In another possible embodiment of the sub-grid controller, the sub-grid controller is a controller that is implemented in the sub-grid in a distributed manner.

This embodiment has the advantage that the locally implemented, distributed controllers may be located close to the power generators, loads or subnetworks and may thereby respond particularly quickly to changes that are critical to the stability of the sub-grid.

In another possible embodiment of the sub-grid controller, the sub-grid controller controls power generators, loads, and subnetworks within a power distribution grid and/or configures the local controllers of the components. For subnetworks, these local controllers may in particular also be hierarchically lower-level sub-grid controllers of the subnetwork.

By controlling the components of the sub-grid directly, it is possible to respond particularly quickly and reliably to changes that are critical to the stability of the sub-grid concerned or critical to the subsequent behavior with respect to the defined target behavior.

According to another aspect, an interconnected grid is provided, which consists of a multiplicity of sub-grids, each of which contains a sub-grid controller. The interconnected grid may itself be a hierarchically lower-level sub-grid of an even larger interconnected grid. For instance, Germany may be the interconnected grid of a plurality of sub-grids within Germany. In addition, Germany may be a sub-grid of the European interconnected system, an even larger interconnected grid.

According to another aspect, a method is provided for controlling components of a sub-grid within an interconnected grid.

The aspect provides a method for controlling components of a sub-grid within an interconnected grid, including using sensors to detect internal and external measured variables of the sub-grid; and controlling components of the sub-grid according to the sensor-detected measured variables in such a way that a dynamic behavior of the sub-grid with respect to its neighboring sub-grids corresponds to a defined target behavior.

The components may be controllable or configurable components.

Controllable components are power generators, loads or subnetworks that may be controlled in real-time and are controlled via data lines and/or control lines directly by a sub-grid controller of the sub-grid concerned. In particular, controllable subnetworks may have their own dedicated subnetwork controller that may be controlled directly by the sub-grid controller.

Configurable components such as power generators, loads or subnetworks have local controllers and are controlled locally by the same. The components may respond to local measured variables such as voltage frequency and voltage amplitude, for example, by changing the active-power and reactive-power feed-in. In particular, configurable subnetworks may have their own subnetwork controller, which is configured by the sub-grid controller, e.g., by specifying a target behavior of the subnetwork, which the subnetwork controller does its best to follow.

According to a possible embodiment of the method, the target behavior of the sub-grid is defined or set by an operator of the interconnected grid.

According to another aspect, a sub-grid controller is provided with a microprocessor that executes a control program containing program commands for implementing the method for controlling components of a sub-grid within an interconnected grid, which method includes using sensors to detect internal and external measured variables of the sub-grid; and controlling components of the sub-grid according to the sensor-detected measured variables in such a way that a dynamic behavior of the sub-grid with respect to its neighboring sub-grids corresponds to a defined target behavior.

A particular advantage here is that the sub-grid controller may execute a configurable control program so that it is flexible to changes in the grid topology, to the replacement of grid components or to a change in the target behavior. In addition, the control program may be transmitted via a network interface to the sub-grid controller so that it is possible to reconfigure or reprogram the sub-grid controller from a remote server, for example, from a server of the interconnected-grid operator or of the operator of the sub-grid concerned.

BRIEF DESCRIPTION OF THE DRAWINGS

Embodiments of the method and of the device for controlling components of a sub-grid within an interconnected grid are explained in greater detail below with reference to the accompanying figures, in which.

DETAILED DESCRIPTION

Figure 1:
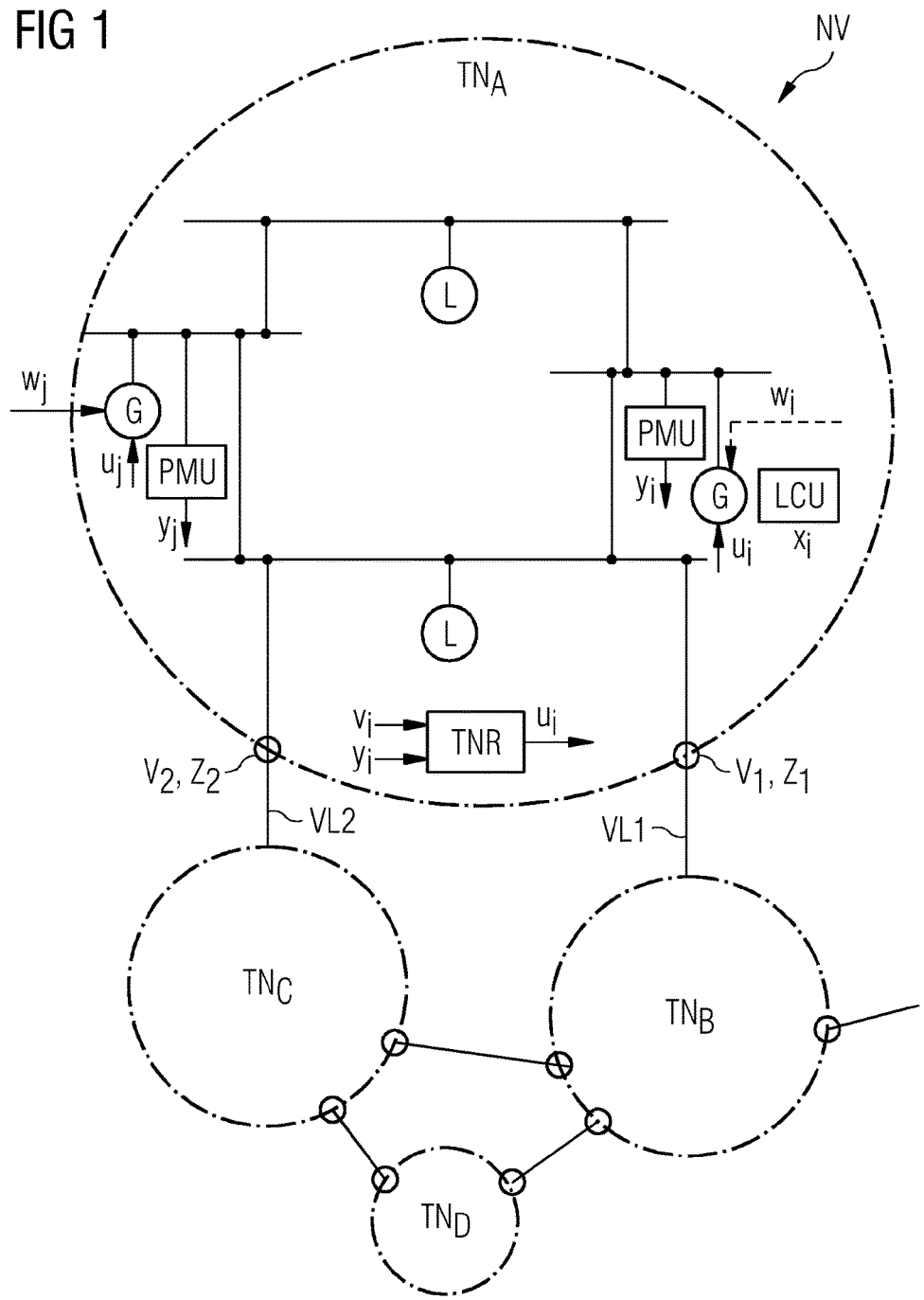
FIG. 1 depicts a schematic diagram of an interconnected grid having a plurality of sub-grids as an example for explaining the manner of operation of the method and the device for controlling power generators of a sub-grid within the interconnected grid.

As FIG. 1 depicts, an interconnected grid NV may consist of a multiplicity of sub-grids $TN_A$, $TN_B$, $TN_C$, and $TN_D$, which are connected to one another via connecting lines VL. Each sub-grid TN may itself consist of subnetworks or lower-level sub-grids, e.g., the interconnected grid NV may have a hierarchical structure. The interconnected grid or electrical grid may be divided into individual areas, which may each be reduced or collapsed down to smaller dynamic sub-models. For instance, a distribution-grid area, which is connected to a transmission grid via a transformer, may form such an area or sub-grid TN. In particular, if the separated area or the sub-grid contains a large number of distributed renewable power generators or electricity generators and/or loads having control interfaces, the operator of the sub-grid, for example, the subsystem operator (DSO: Distribution System Operator) may apply special procedures in order to control the dynamic behavior such that it corresponds to a defined target behavior. The interconnected grid NV may have a hierarchical structure. For example, a plurality of low-voltage grids LV is connected to a medium-high voltage grid MV. A plurality of medium-high voltage grids MV is connected to a high-voltage grid HV. A plurality of high-voltage grids HV is connected, for example, to a European interconnected grid or network NV. Hence in the upper hierarchical levels, the sub-grids may themselves consist of sub-grids, or what are known as subnetworks.

Thus, the method takes a two-stage approach. First, the operator TSO (Transmission System Operator) of the interconnected grid or transmission grid formulates a desired dynamic behavior or target behavior for each connected area or each sub-grid TN such that the overall system stability and performance of the interconnected grid NV is maintained. This may be achieved using simulations or by a suitable controller design. In a further act or stage, the operators DSO of the individual areas or sub-grids may design a control architecture for their particular area such that the sub-grid TN concerned runs internally in a stable manner and behaves with respect to the transmission network or the interconnected grid NV dynamically in the manner specified or defined by the operator TSO of the interconnected grid by the target behavior for the relevant area.

In a further act, the network stability may be analyzed in terms of one or more network parameters on the basis of non-linear simulations and the reduced dynamic models contained in the previous act. The specification of the target behavior of the various areas and the implementation of this target behavior in the various areas may be performed iteratively by the sub-grid controllers TNR until the desired dynamic behavior of each sub-grid or subarea TN corresponds to a desired target behavior with sufficient accuracy. The sub-grids or controllable subareas TN provide a stability service for the entire network or interconnected grid NV. The operators DSO of the sub-grids may receive financial compensation or remuneration, for example, from the operator TSO of the interconnected grid NV for providing this service. The operator TSO of the interconnected grid has the facility to implement one or more actuators for implementing the grid stability services. In addition, the interconnected-grid operator TSO even has the facility to shut down all the conventional electricity generators or power generators entirely if the renewable power generators are supplying the required services.

An interconnected grid NV includes a multiplicity of sub-grids TN, which are connected to one another via connecting lines VL. Each sub-grid TN may itself hierarchically consist of further subnetworks or sub-grids. In one possible embodiment of the interconnected grid, each sub-grid TN has a dedicated sub-grid controller TNR. In another possible embodiment it is also possible that the majority of the sub-grids TN each contain a dedicated sub-grid controller TNR. In one possible implementation, each sub-grid controller TNR includes a microprocessor, which executes a suitable control program for controlling power generators or controllable loads of the sub-grid TN concerned. In this case, the control program contains program commands for controlling components of the sub-grid TN. First, internal and external measured variables of the sub-grid TN are detected by sensors, and external manipulated variables of the sub-grid are captured. The external manipulated variables may be transmitted, for example, in real-time by the operator of the interconnected grid. Then the components of the sub-grid TN are controlled by the sensor-detected measured variables and manipulated variables such that a dynamic behavior of the sub-grid TN concerned with respect to its neighboring sub-grids TN corresponds to a defined target behavior, which is transmitted, for instance, by the operator TSO of the interconnected grid NV via an interface to the sub-grid controller TNR concerned.

Controllable power generators, loads, and subnetworks may be controlled online by the sub-grid controller TNR of the sub-grid concerned. Configurable power generators, loads and subnetworks may be configured and then controlled locally.

FIG. 1 depicts by way of example the structure of an interconnected grid including a plurality of sub-grids $TN_A$, $TN_B$, $TN_C$ and $TN_D$, which are connected to one another via connecting lines VL. In the example depicted, a sub-grid $TN_A$ is connected via two connecting lines VL1, VL2 to neighboring sub-grids $TN_B$, $TN_C$. Each sub-grid $TN_i$ of the interconnected grid contains a multiplicity of different loads L and generators G. The generators G are power generators, for example electricity generators, which generate power from renewable energy sources such as the sun or wind, for example. The various loads L include, for example, individual loads or consumer devices such as refrigerators or the like, or aggregated loads such as the consumers of a residential neighborhood within a local grid for instance. Measurement units such as, for instance, phasor measurement units PMU within the sub-grid TN may use sensors to detect internal measured variables $y_i$ and to supply the same to the sub-grid controller TNR within the sub-grid TN concerned, as depicted in FIG. 1. In addition to the sensor-detected internal measured variables $y_i$, the sub-grid controller TNR of the sub-grid TN also receives sensor-detected external measured variables $v_i$ of the sub-grid TN. The external measured variables of the sub-grid TN are detected by sensors arranged on the connecting lines $VL_i$ between the sub-grid TN and its neighboring sub-grids TN. In the example depicted, the external measured variables V1, V2 may be a local voltage U1 and U2 and a local mains frequency f1 and f2, for instance. In this example, an input measured variable $v_i$ is formed by a pair of measured variables $(u_i, f_i)$ for instance. The sub-grid controller TNR thus receives as input variables the sensor-detected internal measured variables $y_i$ produced by sensors within the sub-grid TN of the controller, and sensor-detected measured variables supplied by sensors that are installed on the connecting lines VL to neighboring sub-grids TN. In addition, the TNR may receive external manipulated variables, for instance from the operator of the interconnected grid. The sub-grid controller TNR calculates from a vector y of the internal measured variables and from a vector v of the external measured variables and external manipulated variables, a control vector $\vec{u}$ for the power generators G, subnetworks or even any controllable loads or consumers. In one possible embodiment, the control vector u for the power generators G and subnetworks and/or controllable loads is calculated from the vector y of the internal measured variables and from a vector v of the external measured variables and external manipulated variables as follows:

$$\vec{u} = K \cdot \vec{y} + L \cdot \vec{v},$$

where K is an output feedback matrix, and L is a feedforward matrix.

Figure 2:
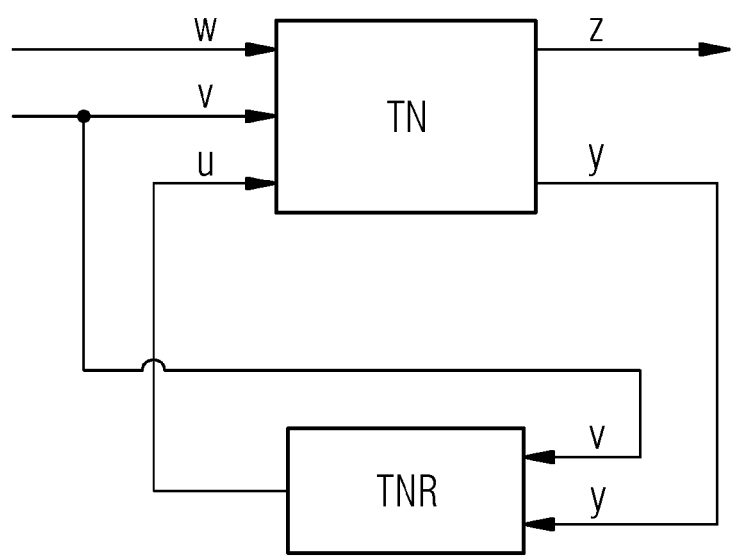
FIG. 2 depicts a schematic diagram for illustrating an example of the manner of operation of the device and the method for controlling components of a sub-grid within an interconnected grid.

The calculation of the control vector u according to the measured variables is also depicted in the schematic diagram of FIG. 2. The calculation of the control vector, or in other words the control of the power generators G, the subnetworks and/or controllable loads is performed such that a dynamic behavior of the sub-grid TN with respect to its neighboring sub-grids corresponds to a defined target behavior, which in particular may be defined by an operator TSO of the interconnected grid NV. In one possible embodiment, the sub-grid controller TNR may be implemented by a central controller provided in the sub-grid TN concerned. In another possible embodiment, the sub-grid controller TNR may also be implemented in a distributed manner by various controllers within the sub-grid TN. The calculation of the control vector u according to the vectors y, v of the measured variables may be performed, for example, by a microprocessor executing a suitable control program.

As depicted in FIG. 1, the various generators G are controlled by control variables of the control vector u. In addition, the generators G may also be affected by external disturbance variables $w_i$, $w_j$. For instance, the power generators or electricity generators G may be generators that produce power from renewable energies such as the wind or sun. A change in the strength of the sun and of the wind may change in an uncontrollable manner the amount of electricity produced by the generators. The disturbance vector w takes account of this change.

The sub-grid TN may include, in addition to the power generators G that produce power from renewable energies, also conventional power generators such as gas turbines or the like, for example.

The instantaneous state of the sub-grid TN may be calculated by the following differential equation:

$$\dot{\vec{x}} = A \cdot \vec{x} + B_1 \cdot \vec{u} + B_2 \cdot \vec{v} + B_3 \cdot \vec{w}$$

where $\vec{x}$ is the state vector of the sub-grid TN, $\vec{u}$ is the control vector for controlling the controllable components within the sub-grid, $\vec{v}$ is the vector of the sensor-detected external measured variables and external manipulated variables, and $\vec{w}$ is the disturbance vector.

The variables A, $B_1$, $B_2$, $B_3$ are matrices that define the dynamic behavior of the particular subsystem or sub-grid TN. The vector x may define the state of a sub-grid TN, for instance the charge level SOC of a battery or the states of relevant control units in a photovoltaic inverter PVI. The control vector u forms the input variable of the controllable power generators G or of the subnetworks or loads, whereas v represents external measured variables and manipulated variables, e.g., input variables supplied by a higher-level sub-grid TN or interconnected grid, for example by the transmission grid, for instance variables such as changes in the frequency or voltage amplitude. The disturbance vector w defines disturbances in the power generation or also load fluctuations.

The vector y of the internal measured variables of the sub-grid TN describes the internally measured variables, for instance power measurements from photovoltaic inverters PVI or smart meters, and voltage and current measurements from phasor measurement units PMUs. It may be calculated by the following equation:

$$\vec{y} = C \cdot \vec{x} + D_1 \cdot \vec{u} + D_2 \cdot \vec{v} + D_3 \cdot \vec{w}$$

where $\vec{x}$ is the state vector of the sub-grid, $\vec{u}$ is the control vector for controlling the controllable components within the sub-grid, $\vec{v}$ is the vector of the sensor-detected external measured variables and external manipulated variables, and $\vec{w}$ is the disturbance vector and where C, $D_1$, $D_2$, $D_3$ are matrices.

In one possible embodiment, the output vector $\vec{z}$ of the output variables of the sub-grid TN may be calculated by the following equation:

$$\vec{z} = E \cdot \vec{x} + F_1 \cdot \vec{u} + F_2 \cdot \vec{v} + F_3 \cdot \vec{w}$$

where $\vec{x}$ is the state vector of the sub-grid, $\vec{u}$ is the control vector for controlling the controllable components of the sub-grid, $\vec{v}$ is the vector of the sensor-detected external measured variables and external manipulated variables, and $\vec{w}$ is the disturbance vector, and where E, $F_1$, $F_2$, $F_3$ are matrices.

The output-variables vector z describes the output of the sub-grid TN to a higher-level associated sub-grid TN or to the interconnected grid, for example changes in the active-power and reactive-power feed-in to the transmission grid or neighboring sub-grids. The matrices A, $B_1$, $B_2$, $B_3$, C, $D_1$, $D_2$, $D_3$, E, $F_1$, $F_2$, $F_3$ used in the calculation specify the dynamic behavior of the particular subsystem or sub-grid TN. The dynamic-behavior matrix A may contain additional control requirements for the non-controllable distributed power generators, in particular, for those power generators that cannot be controlled remotely but still contribute to the dynamic behavior of the sub-grid TN. These control systems may be set separately.

A defined reduced model of the sub-grid TN may be defined as follows:

$$\dot{x}_d = A_d x_d + B_d v$$

$$z_d = E_d x_d + F_d v$$

where $x_d$ is the state of the reduced model, and v represents input variables from the higher-level grid. These correspond to the external measured variables and external manipulated variables of the sub-grid TN.

$z_d$ represents the desired output from the sub-grid TN with respect to the higher-level sub-grid TN, where $z_d$ constitutes a desired output value. The number of states of the system or of the state vector x of the dynamic system of the sub-grid TN is greater than the number of states of the reduced model $x_d$.

For instance in a simple example, the sub-grid may include merely one connection point to an external electrical grid or transmission grid. In this simple case, the input measured-variables vector $v=(f,U)^T$ depends on the voltage frequency f and the amplitude U at the connection point to the external grid.

In this simple example, the output $z=(P,Q)^T$ is the active power P and the reactive power Q that is supplied to the external grid at this one connection point. In this simple example, the sub-grid TN is meant to behave as a droop controller including a low-pass filter. The resultant target behavior in this case is:

$$x'_d = \begin{bmatrix} -\frac{1}{K_P T_P} & 0 \\ 0 & -\frac{1}{K_Q T_Q} \end{bmatrix} x_d + \begin{bmatrix} -\frac{1}{T_P} & 0 \\ 0 & -\frac{1}{T_Q} \end{bmatrix} v$$

$$z_d = \begin{bmatrix} 1 & 0 \\ 0 & 1 \end{bmatrix} x_d$$

Where $z_d = x_d = (P_d, Q_d)^T$, e.g., is the desired active power and reactive power that is supplied to the external grid, and $T_P$ and $T_Q$ are the time constants of the low-pass filter for the active-power and reactive-power droop control. The power droop gains for the active power and reactive power are $K_P$ and $K_Q$. In the steady state, e.g., for $\dot{x}_d=0$, it holds that $P_d=-K_P \cdot f$ and $Q_d=-K_Q \cdot U$, which corresponds to the conventional droop gains employed in transmission grids.

For a sub-grid having two connection points to neighboring sub-grids, the vector of the sensor-detected external measured variables is $v=(f_1, U_1, f_2, U_2)^T$, and the output-variables vector is $z=(P_1, Q_1, P_2, Q_2)^T$, where the indices 1, 2 for the measured variables f, U, P, Q indicate the connection point with which the relevant value is associated. A reduced model, similar to the model presented above, in this case is given by:

$$\dot{x}_d = \begin{bmatrix} -\frac{1}{K_{P1} T_{P1}} & 0 & 0 & 0 \\ 0 & -\frac{1}{K_{Q1} T_{Q1}} & 0 & 0 \\ 0 & 0 & -\frac{1}{K_{P2} T_{P2}} & 0 \\ 0 & 0 & 0 & -\frac{1}{K_{Q2} T_{Q2}} \end{bmatrix} x_d + \begin{bmatrix} -\frac{1}{T_{P1}} & 0 & 0 & 0 \\ 0 & -\frac{1}{T_{Q1}} & 0 & 0 \\ 0 & 0 & -\frac{1}{T_{P2}} & 0 \\ 0 & 0 & 0 & -\frac{1}{T_{Q2}} \end{bmatrix}$$

$$z_d = \begin{bmatrix} 1 & 0 & 0 & 0 \\ 0 & 1 & 0 & 0 \\ 0 & 0 & 1 & 0 \\ 0 & 0 & 0 & 1 \end{bmatrix} x_d$$

where each connection point or connection line VL has its own active-power and reactive-power droop gain $K_{Pi}$, $K_{Qi}$, i=1, 2, and active-power and reactive-power time constants $T_{Pi}$, $T_{Qi}$, i=1, 2.

The sub-grid controller TNR may constitute a static or dynamic controller for which the control vector for the power generators G is calculated from the vector y of the internal measured variables and a vector v of the external measured variables and manipulated variables as follows: $u = K \cdot y + L \cdot v$, where the control vector u is calculated so as to make the error $z-z_d$ practically zero, and the control vector u for the controlled power generators, loads, and subnetworks depends on the measured variables y within the sub-grid and on the external measured variables v of the sub-grid. It is possible here to take into account the special situation in which the vector v of the external measured variables is not measured, e.g., in which the feedforward matrix L equals 0 (L=0). The term $z-z_d$ being practically zero may be expressed using various signal-norm and system-norm notations such as $H_2$ or $H_\infty$.

In one possible embodiment, the sub-grid controller TNR may be designed or implemented by a design algorithm for the control matrices K and L on the basis of a $H_\infty$ system norm. In this case, the external input variables v and w are considered to be deterministically arbitrary but power-limited signals. A value γ may be defined as the upper limit of a ratio between the $l_2$ norm of the controller error $e=z-z_d$ and the $l_2$ norm of $(v,w)^T$, e.g.:

$$\gamma \geq \max_{\|(v,w)^T\|_2 \neq 0} \frac{\|e\|_2}{\left\|\begin{pmatrix} v \\ v \end{pmatrix}\right\|_2}.$$

The smaller this value γ is, the smaller the effect of the measured variables v and the disturbance variables w on the error e and hence on the difference between the output value z and setpoint value $z_d$. The resultant sub-grid controller TNR may be designed such that the effect of both v and w on $z-z_d$ may be minimized. It may be assumed by way of example for illustrative purposes that the matrices $D_1$, $D_2$, $D_3$, $F_1$, $F_2$, $F_3$, $F_d$ equal zero. Similar results may be obtained when these matrices are non-zero. The following is obtained:

$$\dot{x}=(A+B_1KC)x+(B_2+B_1L)v+B_3w$$

$$z=Ex$$

where for designing the output feedback matrix K and the feedforward matrix L a new system may be formulated as follows:

$$\begin{bmatrix} \dot{x} \\ \dot{x}_d \\ e \end{bmatrix} = \begin{bmatrix} A+B_1KC & 0 & B_2+B_1L & B_3 \\ 0 & A_d & B_d & 0 \\ E & -E_d & 0 & 0 \end{bmatrix} \begin{bmatrix} x \\ x_d \\ v \\ w \end{bmatrix}$$

Hence the output feedback matrix K and the feedforward matrix L is designed to minimize γ, e.g., the error e lies as close as possible to zero for power-limited w and v. One possible solution lies in the following optimization problem:

$$\min_{P,K,L} \gamma$$

$$\text{s.t. } P = P^T > 0$$

$$\begin{bmatrix} \begin{bmatrix} A+B_1KC & 0 \\ 0 & A_d \end{bmatrix}^T P + P\begin{bmatrix} A+B_1KC & 0 \\ 0 & A_d \end{bmatrix} & P\begin{bmatrix} B_2+B_1L & B_3 \\ B_d & 0 \end{bmatrix} & \begin{bmatrix} E \\ -E_d \end{bmatrix} \\ \begin{bmatrix} B_2+B_1L \\ B_d \end{bmatrix}^T P & -\gamma I & 0 \\ (E-E_d) & 0 & -\gamma I \end{bmatrix} < 0$$

where P is a square matrix of optimization variables of the dimension of A plus the dimension of $A_d$, and where I is the identity matrix and >0, <0 represents the positive or negative definiteness of the corresponding matrices.

The optimization problem presented above is not convex because the bilinear matrix inequality BMI contains products of the matrix P and the output feedback matrix K and the feedforward matrix L. Standard algorithms for BMIs may be used in order to solve this optimization problem. Similar algorithms may be derived for the following cases:

(1) The controller may not measure or detect the external measured variables and hence the feedforward matrix equals 0 (L=0).

(2) Locally implemented sub-grid controllers TNR may be configured, which use only local measured variables, where the output feedback matrix K, with suitable sorting of the vectors y and u, is a diagonal matrix, and the feedforward matrix L is zero (L=0).

(3) A dynamic sub-grid controller TNR of the following form may be used:

$$\dot{x}_c = A_c x_c + B_{c1} y + B_{c2} v$$

$$u = C_c x_c + D_{c1} y + D_{c2} v$$

where all the matrices $A_c$, $B_{c1}$, $B_{c2}$, $C_c$, $D_{c1}$, $D_{c2}$ are formulated or implemented in a suitable algorithm.

The sub-grid controller TNR or the method for controlling components of a sub-grid TN within an interconnected grid NV is suitable in particular for sub-grids that contain a high proportion of power generators that produce power from renewable energy sources. The relevant sub-grid operators DSO may use suitable design algorithms to design the sub-grid controller TNR and the dynamic behavior. In addition, a suitable design algorithm may be used by the interconnected-grid operator TSO for a country-wide design of the interconnected grid. The sub-grid controller TNR controls power generators or loads of the sub-grid TN according to measured variables of the sub-grid TN in such a way that the dynamic behavior of the sub-grid TN concerned, as operated by the relevant sub-grid operator DSO, with respect to its neighboring sub-grids corresponds to a defined target behavior, which may be defined, for example, by an operator TSO of the interconnected grid. The sub-grid controller TNR is thus designed in accordance with the target behavior that is defined by the interconnected-grid operator TSO. The dynamic behavior of the sub-grid TN may be configured accordingly.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A sub-grid controller for a sub-grid within an interconnected grid, the sub-grid controller comprising:

a first controller configured to control power generators or loads of the sub-grid according to sensor-detected internal measured variables, sensor-detected external measured variables and external manipulated variables, or any combination thereof of the sub-grid, such that a dynamic behavior of the sub-grid with respect to neighboring sub-grids corresponds to a defined target behavior, wherein the first controller is configured to calculate a control vector $\vec{u}$ for the power generators, the loads, and subnetworks from a vector $\vec{y}$ of the sensor detected internal measured variables and a vector $\vec{v}$ of the sensor-detected external measured variables and the external manipulated variables as follows:

$$\vec{u} = K \cdot \vec{y} + L \cdot \vec{v}, \text{ where}$$

K is an output feedback matrix, and
L is a feedforward matrix.

2. The sub-grid controller of claim 1, wherein the first controller receives from an operator of the interconnected grid a target behavior for stabilizing the interconnected grid.

3. The sub-grid controller of claim 1, wherein the external measured variables of the sub-grid are detected by sensors, that are arranged on connecting lines between the sub-grid and the neighboring sub-grids.

4. The sub-grid controller of claim 1, wherein the internal measured variables are detected by sensors, which that are arranged on lines or devices within the sub-grid.

5. The sub-grid controller of claim 1, wherein an instantaneous state of the sub-grid is calculable by a following differential equation:

$$\dot{\vec{x}} = A \cdot \vec{x} + B_1 \cdot \vec{u} + B_2 \cdot \vec{v} + B_3 \cdot \vec{w}$$

wherein $\vec{x}$ is a state vector of the sub-grid, $\vec{u}$ is the control vector for controlling the controllable power generators, the loads, and the subnetworks within the sub-grid, $\vec{v}$ is the vector of the sensor-detected external measured variables and the external manipulated variables, and $\vec{w}$ is a disturbance vector, and wherein A, $B_1$, $B_2$, $B_3$ are matrices.

6. The sub-grid controller of claim 1, wherein the vector $\vec{y}$ of the internal measured variables of the sub-grid is calculable by a following equation:

$$\vec{y} = C \cdot \vec{x} + D_1 \cdot \vec{u} + D_2 \cdot \vec{v} + D_3 \cdot \vec{w}$$

wherein $\vec{x}$ is a state vector of the sub-grid, $\vec{u}$ is the control vector for controlling the controllable power generators, the loads, and the subnetworks within the sub-grid, $\vec{v}$ is the vector of the sensor-detected external measured variables and the external manipulated variables, and $\vec{w}$ is a disturbance vector, and wherein C, $D_1$, $D_2$, $D_3$ are matrices.

7. The sub-grid of claim 1, wherein an output vector $\vec{z}$ of the output variables of the sub-grid is calculable by a following equation:

$$\vec{z} = E \cdot \vec{x} + F_1 \cdot \vec{u} + F_2 \cdot \vec{v} + F_3 \cdot \vec{w}$$

wherein $\vec{x}$ is a state vector of the sub-grid, $\vec{u}$ is the control vector for controlling the controllable power generators, the loads, and the subnetworks within the sub-grid, $\vec{v}$ is the vector of the sensor-detected external measured variables and the external manipulated variables, and $\vec{w}$ is a disturbance vector, and wherein E, $F_1$, $F_2$, $F_3$ are matrices.

8. The sub-grid controller of claim 1, wherein the first controller is a central controller provided in the sub-grid concerned or a controller that is implemented in the sub-grid in a distributed manner.

9. The sub-grid controller of claim 1, wherein the sub-grid controller controls the power generators, the loads, the subnetworks, or any combination thereof within a power distribution grid or configures local controllers of the power generators, the loads, the subnetworks, or any combination thereof.

10. The sub-grid controller of claim 1, wherein the first controller is further configured to control the subnetworks of the sub-grid.

11. The sub-grid controller of claim 1, wherein the power generators of the sub-grid are coal-fired power stations, nuclear power stations, gas turbines, power generators that generate energy from sunlight or wind, or any combination thereof, and wherein the loads of the sub-grid are power supplies of factories, housing estates, neighborhoods, refrigerators, a nation, or any combination thereof.

12. An interconnected grid comprising:
a plurality of sub-grids, each sub-grid of the plurality of sub-grids comprising a sub-grid controller configured to control power generators or loads of the sub-grid according to sensor-detected internal measured variables, sensor-detected external measured variables and external manipulated variables, or any combination thereof of the sub-grid, such that a dynamic behavior of the sub-grid with respect to neighboring sub-grids corresponds to a defined target behavior, wherein a first sub grid controller of a first sub grid of the plurality of sub grids is configured to calculate a control vector $\vec{u}$ for the power generators, the loads, and subnetworks from a vector $\vec{y}$ of the sensor-detected internal measured variables and a vector $\vec{v}$ of the sensor-detected external measured variables and the external manipulated variables as follows:

$$\vec{u} = K \cdot \vec{y} + L \cdot \vec{v}, \text{ where}$$

K is an output feedback matrix, and
L is a feedforward matrix.

13. The interconnected grid of claim 12, wherein each sub-grid of the plurality of sub-grids comprises controllable, configurable, or controllable and configurable power generators, subnetworks, loads, or any combination thereof.

14. The interconnected grid of claim 12, wherein the sub-grid controller is further configured to control the subnetworks of the sub-grid.

15. A method for controlling units of a sub-grid within an interconnected grid, the method comprising:
detecting, using sensors, internal and external measured variables of the sub-grid;
controlling power generators or loads of the sub-grid according to the sensor-detected measured variables and external manipulated variables such that a dynamic behavior of the sub-grid with respect to neighboring sub-grids corresponds to a defined target behavior, wherein controlling further comprises calculating a control vector $\vec{u}$ for the power generators, the loads, and subnetworks from a vector $\vec{y}$ of the sensor-detected internal measured variables and a vector $\vec{v}$ of the sensor-detected external measured variables and the external manipulated variables as follows:

$$\vec{u}=K\cdot\vec{y}+L\cdot\vec{v}, \text{ where}$$

K is an output feedback matrix, and
L is a feedforward matrix.

16. The method of claim 15, wherein the target behavior of the sub-grid is defined or set by an operator of the interconnected grid.

17. The method of claim 15, wherein the controlling further comprises controlling the subnetworks of the sub-grid.

18. A sub-grid controller comprising:
a microprocessor configured to control power generators or loads of the sub-grid according to sensor-detected internal measured variables, sensor-detected external measured variables and external manipulated variables, or any combination thereof of the sub-grid, such that a dynamic behavior of the sub-grid with respect to neighboring sub-grids corresponds to a defined target behavior,
wherein the microprocessor is configured to calculate a control vector $\vec{u}$ for the power generators, the loads, and subnetworks from a vector $\vec{y}$ of the sensor-detected internal measured variables and a vector $\vec{v}$ of the sensor-detected external measured variables and the external manipulated variables as follows:

$$\vec{u}=K\cdot\vec{y}+L\cdot\vec{v}, \text{ where}$$

K is an output feedback matrix, and
L is a feedforward matrix.

19. The sub-grid controller of claim 18, wherein the microprocessor is further configured to control the subnetworks of the sub-grid.

* * * * *